G. A. LYON.
AUTOMOBILE BUFFER ATTACHING DEVICE.
APPLICATION FILED JULY 20, 1922.
1,437,601.
Patented Dec. 5, 1922.
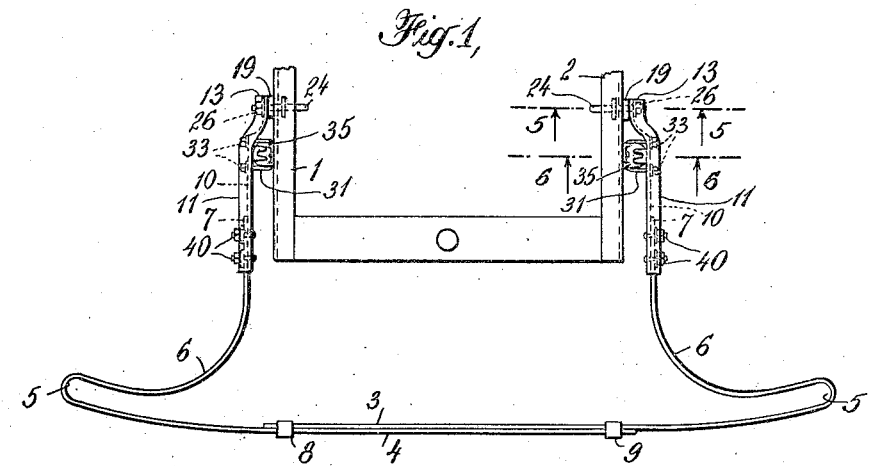
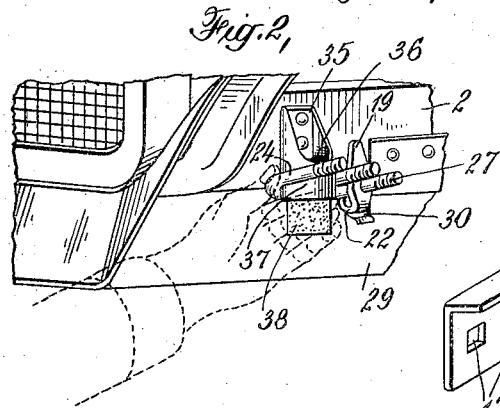
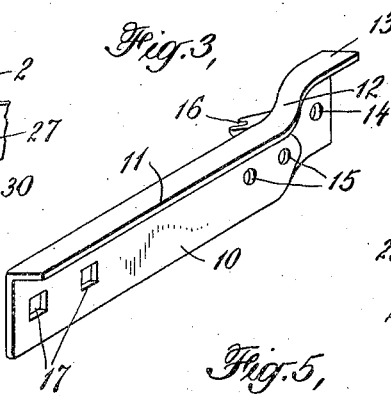
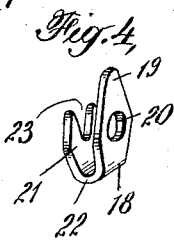
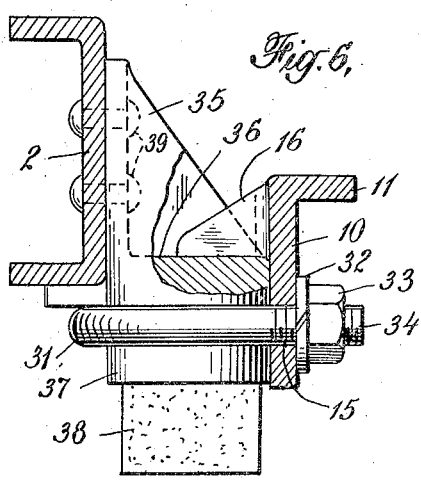
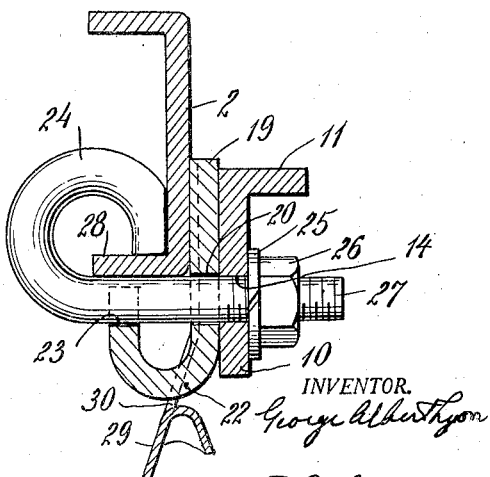
INVENTOR.
George Albert Lyon
Harry L. Duncan
ATTORNEY.

Patented Dec. 5, 1922.

1,437,601

UNITED STATES PATENT OFFICE.

GEORGE ALBERT LYON, OF PHILADELPHIA, PENNSYLVANIA.

AUTOMOBILE BUFFER-ATTACHING DEVICE.

Application filed July 20, 1922. Serial No. 573,240.

*To all whom it may concern:*

Be it known that I, GEORGE ALBERT LYON, a citizen of the United States, and resident of Philadelphia, county of Philadelphia, State of Pennsylvania, have made a certain new and useful Invention Relating to Automobile Buffer-Attaching Devices, of which the following is a specification, taken in connection with the accompanying drawing.

This invention relates especially to buffer attaching devices adapted to attach Lyon or other buffers to the front of Chevrolet or generally similar automobiles. The attachment comprises extension supporting brackets which may be formed of malleable iron or drop forgings, for instance, and may be provided advantageously with projecting flanges or stiffening portions which at the front of the bracket may serve as aligning flanges for the cooperating buffer attaching members which may be bolted or connected thereto. These brackets may each be formed with an inwardly projecting aligning lug or member which is adapted to rest upon or engage any suitable projection such as the cushion support or casing while a U-bolt or other clamping device may extend through this part of the bracket so as to clamp around the cushion support on which this aligning lug rests. This gives a definite and reliable support for this part of the bracket which may have a rear attaching end adapted to be bolted or otherwise secured to the automobile frame.

In the accompanying drawing which shows in a somewhat diagrammatic manner an illustrative embodiment of this invention:

Fig. 1 is a plan view showing the brackets in place and supporting a buffer on an automobile.

Fig. 2 is a side perspective view showing the arrangement of the clamping devices.

Fig. 3 is a corresponding perspective view of the bracket.

Fig. 4 shows a U-bolt spacer.

Fig. 5 is a transverse sectional view through the U-bolt which may be used at the attaching end of the bracket, this section being taken along the line 5—5 of Fig. 1, and Fig. 6 is a corresponding transverse section taken along the line 6—6 of Fig. 1.

These brackets are illustrated as supporting a spring strip buffer of the Lyon type on the front of a Chevrolet automobile although, of course, the attaching device is adapted to be used with other types or styles of buffers or bumpers which preferably have rearwardly extending spring strips or other attaching members. As shown in Fig. 1, the illustrative buffer may comprise the spring strip attaching member 7, each curving outward at 6 to form the end loops 5 which may extend into protective position in front of the automobile wheels. The spring strips may be bent inwardly from these end loops so that their ends 3, 4 extend into overlapping or reenforcing position in which they may be adjustably clamped by the clips or clamping devices 8, 9.

The extension supporting brackets may, as shown in Fig. 3, be formed of malleable iron and may each have adjacent its front end one or more buffer aligning flanges 11 extending laterally outward, for instance, from the substantially vertical portion or face 10 of the bracket in which buffer connector portion at the front of the bracket may be formed the square or other apertures 17. These apertures may accommodate the square or other noncircular shanks of the connector bolts 40 extending therethrough and through suitable holes in the attaching arms or members 7 of the buffer so as to rigidly and securely connect these parts. Any suitable intermediate portion of each bracket is preferably provided with holes or apertures such as 15 to accommodate a clamping device such as the U-bolt 31 having the stems 34 extending through these holes so that the U-bolt may be clamped around the depending cushion casing or support 37 or any other projection on the automobile. In this instance the cushion casing may have its upper portion 35 secured by the rivets 39 to the web 2 of the automobile frame member so that this depending portion 35 of the casing is rigidly connected to the frame so as to properly support the rubber or other cushion 38. This leaves the rigid horizontal top 36 of this casing in such position that it can be engaged by the aligning lug or member 16 in the bracket 10, this lug having, if desired, a bifurcated inner end as shown in Figs. 1 and 3, which is desirable where a projecting bolt or screw is used to secure the cushion in position.

This adjacent U-bolt and aligning lug make possible the definite positioning of this part of the bracket which may be securely bolted to the automobile at this point and the rear or attaching end of the bracket may advantageously be bolted to the automobile frame as by a U-bolt having its threaded stem 27 passing through the hole 14 in this attaching end 13 of the bracket which is preferably curved inward to properly engage the frame web as is indicated in Figs. 1 and 3. As shown somewhat diagrammatically in Fig. 5, the end 24 of this hook bolt is adapted to engage the inner face 28 of the frame flange and tightly hold the U-bolt in position in connection with the spacer 19 which may advantageously be used between the frame web and the bracket, these parts being bolted together by the nut 26 and lock washer 25, if desired. As shown in Fig. 4, this spacer may have the bent portion 22 and the inner portion 21 which may be substantially parallel with the outer face 18 and this inner portion may be bifurcated so as to form the socket 23 in substantially engagement with the stem of the hook bolt when the parts are forced together. In some cases where a splash pan 29, is used on this part of the automobile, a portion such as 29 may be bent downward somewhat so as to facilitate the insertion or application of the hook bolt spacer at the point 30.

As indicated in Fig. 2, it is usually desirable to first apply the hook bolt and spacer in this way and then the U-bolt may be manually supported around the cushion casing 37 so that the bracket may be applied in such a way as to allow these projecting bolt ends to pass through the holes 14, 15 in the bracket. At the same time, the aligning lug 16 is slipped into place upon the top 36 of the cushion casing so as to give considerable support to the bracket while the hook bolt is being tightened by the application of the tightening nut 26. The U-bolt may then be tightened around the cushion casing to support the bracket in its final position. Both these brackets are preferably secured to the frame members of the automobile before the attaching arms or members of the buffer are bolted or secured thereto.

This invention has been described in connection with a number of embodiments, forms, proportions, parts, arrangements, materials, methods of connection and use, to the details of which disclosure the invention is not of course to be limited, since what is claimed as new and what is desired to be secured by Letters Patent is set forth in the appended claims.

I claim:

1. In automobile buffers, a buffer having spring strip attaching members, a pair of extension supporting brackets each having a stiffening flange extending outward from its substantially vertical face and having connecting bolt holes adjacent the front end of the bracket to bolt the buffer attaching member thereto, the rear end of each bracket being adapted to engage the web of the automobile frame member and being formed with a hole, a spacer and a hook bolt extending through the spacer and hole to cooperate with the flange of the frame member, the intermediate portion of each bracket being formed with an inwardly projecting lug to rest on the top of a cushion casing secured to the automobile frame and an adjacent U-bolt extending through said bracket to be bolted around said casing.

2. In automobile buffers a buffer having spring strip attaching members, a pair of extension supporting brackets each having a stiffening flange extending outward from its substantially vertical face and having connecting bolt holes adjacent the front end of the bracket to bolt the buffer attaching member thereto, the rear end of each bracket being adapted to engage the automobile frame member and being formed with a hole, a spacer and a hook bolt extending through the spacer and hole to cooperate with the flange of the frame member, the intermediate portion of each bracket being formed with an inwardly projecting lug to rest on the top of a cushion casing secured to the automobile frame and an adjacent clamping device extending through said bracket to be bolted around said casing.

3. In automobile buffers, a buffer having attaching members, a pair of extension supporting brackets having connecting bolt holes adjacent the front ends of the brackets to bolt the buffer attaching member thereto, the rear end of each bracket being bent inward to engage the web of the automobile frame member and being formed with a hole and a hook bolt extending through the hole to cooperate with the flange of the frame member, the intermediate portion of each bracket being formed with an inwardly projecting member to engage a projection secured to the automobile frame and an adjacent clamping device extending through said bracket to be bolted to said frame.

4. In automobile buffers, a buffer having attaching members, a pair of extension supporting brackets having connecting means adjacent the front ends of the brackets to bolt the buffer attaching member thereto, the rear end of each bracket being formed with a hole and a bolt extending through the hole to cooperate with the frame member, the intermediate portion of each bracket being formed with an inwardly projecting member to engage a projection secured to the automobile frame and an adjacent clamping device extending through said bracket to be bolted to said frame.

5. In automobile buffer attaching devices, a pair of extension supporting brackets each formed at the upper edge of its substantially vertical face with an outwardly projecting stiffening aligning flange, connecting means comprising a square hole adjacent the front of each bracket, the rear of each bracket being bent inward to cooperate with the web of the automobile frame member and being formed with an aperture to accommodate a hook bolt extending around the frame flange, the adjacent intermediate part of each bracket being formed with an inwardly projecting aligning lug adapted to rest upon a cushion casing secured to the automobile frame and a U-bolt clamping device extending through an adjacent portion of each bracket to be clamped around said cushion casing.

6. In automobile buffer attaching devices, a pair of extension supporting brackets each formed at the upper edge of its substantially vertical face with connecting means comprising a hole adjacent the front of each bracket, the rear of each bracket being bent inward to cooperate with the automobile frame member and being formed with an aperture to accommodate a hook bolt extending around the frame flange, the adjacent intermediate part of each bracket being formed with an inwardly projecting aligning lug adapted to rest upon a depending projection to the automobile frame and a U-bolt clamping device extending through an adjacent portion of each bracket to be clamped around said depending projection.

7. In automobile buffer attaching devices a pair of extension supporting brackets each formed adjacent one end with an inwardly bent attaching portion to cooperate with the automobile frame member and adapted to be secured thereto the adjacent intermediate part of each bracket being formed with an inwardly projecting aligning member adapted to engage a depending cushion casing secured to the automobile frame and a clamping device cooperating with an adjacent portion of each bracket to be clamped around said cushion casing.

8. In automobile buffer attaching devices extension supporting brackets each formed adjacent one end with an attaching portion to cooperate with the automobile frame member and adapted to be secured thereto, the adjacent intermediate part of each bracket being formed with an inwardly projecting aligning member adapted to engage a projection on the automobile frame and a clamping device cooperating with an adjacent portion of each bracket to be clamped to the frame member.

GEORGE ALBERT LYON.